United States Patent [19]

Danielsen et al.

[11] 4,393,378

[45] Jul. 12, 1983

[54] GENERATION OF A LIGHT INTENSITY CONTROL SIGNAL

[75] Inventors: Petter Danielsen, Schwerte, Fed. Rep. of Germany; Tor Moen, Oslo, Norway

[73] Assignee: Tandberg Data A/S, Norway

[21] Appl. No.: 253,372

[22] Filed: Apr. 13, 1981

[30] Foreign Application Priority Data

Sep. 29, 1980 [DE] Fed. Rep. of Germany ....... 3036737

[51] Int. Cl.³ .............................................. G06F 3/14

[52] U.S. Cl. .................................... 340/744; 340/812; 340/813

[58] Field of Search ............... 340/700, 706, 720, 723, 340/728, 730, 732, 733, 744, 747, 748, 749, 750, 789, 793, 803, 804, 811, 812, 813

[56] References Cited

U.S. PATENT DOCUMENTS 3,725,901 4/1973 Lehari ................................ 340/744
3,883,778 5/1975 Kaji .................................... 340/813
3,986,186 10/1976 Cochran .............................. 340/812
4,228,433 10/1980 Matsumoto ......................... 340/803
4,314,245 2/1982 Wilbur, Jr. .......................... 340/744

*Primary Examiner*—Michael A. Masinick
*Attorney, Agent, or Firm*—Hill, Van Santen, Steadman, Chiara & Simpson

[57] ABSTRACT

A system for the generation of a light intensity control signal for a video amplifier of a data display device is disclosed which is connected with a video signal line and a pulse generator. When displaying characters composed of horizontal lines and vertical rows of points on a screen, the lines display a higher brightness than the points. The disclosed system derives from the video signal an analog light intensity control signal for the video amplifier with which the light intensity of the points is readjusted. The system includes a detector device connected with a video signal line, the detector device identifying the signal sequence associated to a point, a line or, a blank and a converter which derives a light intensity control signal therefrom.

6 Claims, 3 Drawing Figures

FIG1
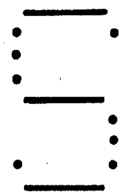
FIG 2
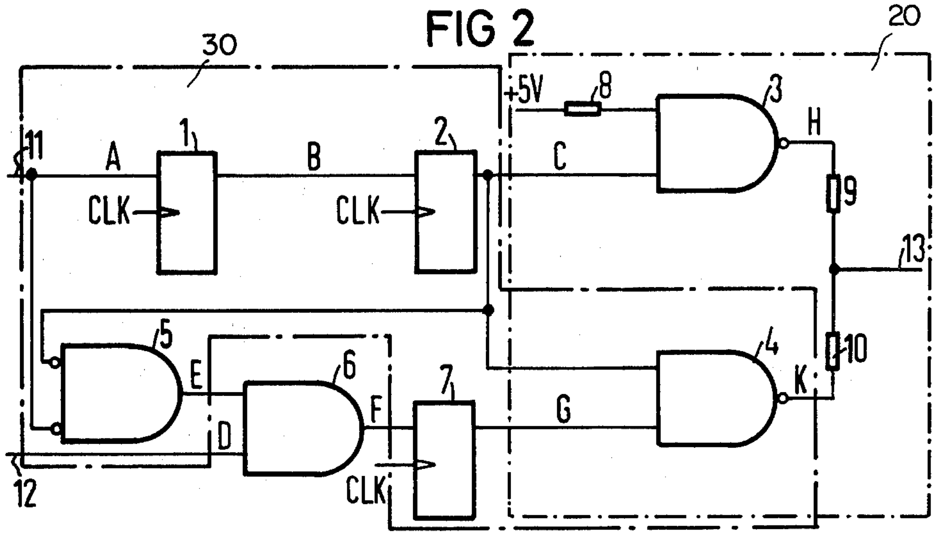
FIG3
| A(t) | B(t) | C(t) | D(t) | E(t) | F(t) | G(t+1) | H(t+1) | K(t+1) |
|---|---|---|---|---|---|---|---|---|
| X | 0 | X | 0 | X | 0 | 0 | 1 | 1 |
| X | 1 | X | 0 | X | 0 | 0 | 0 | 1 |
| 0 | 0 | 0 | 1 | 1 | 1 | 1 | 1 | 1 |
| 0 | 0 | 1 | 1 | 0 | 0 | 0 | 1 | 1 |
| 0 | 1 | 0 | 1 | 1 | 1 | 1 | 0 | 0 |
| 0 | 1 | 1 | 1 | 0 | 0 | 0 | 0 | 1 |
| 1 | 0 | 0 | 1 | 0 | 0 | 0 | 1 | 1 |
| 1 | 0 | 1 | 1 | 0 | 0 | 0 | 1 | 1 |
| 1 | 1 | 0 | 1 | 0 | 0 | 0 | 0 | 1 |
| 1 | 1 | 1 | 1 | 0 | 0 | 0 | 0 | 1 |

GENERATION OF A LIGHT INTENSITY CONTROL SIGNAL

BACKGROUND OF THE INVENTION

The invention concerns an arrangement for the generation of a light intensity control signal for a video amplifier of a data display device which is connected with a video signal line and a pulse generator. Characters are displayed with bright horizontal lines and vertical rows of bright points, and blank or dark lines or points (hereinafter "blank").

The displaying of alphanumeric characters or of graphics on a data display device as known can proceed by deflecting a cathode ray line-by-line over the screen of the data display device. By means of brightness controlling or, respectively, blanking controlling of the cathode ray, lines and points or, respectively, blanks can be displayed. A character can be formed from lines or points of several lines following one another in that horizontal character parts are formed from lines and vertical character parts are formed from series of points. However, it has been shown that these different displays of character parts bring about a varying brightness. The lines display a higher brightness than the points. This means that characters composed of horizontal and vertical character parts as well as the entire type character of the data display device have an uneven and non-uniform effect. The eye is strained during reading and this causes a rapid tiring. This can result both in reading errors and also eye damage.

SUMMARY OF THE INVENTION

It is an object of the invention to provide an arrangement with which the varying brightnesses of vertical and horizontal character parts occurring due to the different displays are equalized.

This problem is solved according to the invention by a converter connected with the video amplifier which gives a light intensity control signal with at least three differentiatable analog output or setting values to the video amplifier. A detector device is connected with the video signal line and the converter for the identification of the signal sequence associated to a line, a point or, respectively, blank; it therefore assumes one of three output states for delivery to the converter.

This arrangement has the advantage that with the help of the converter, the brightness of the darker points with respect to the brighter lines is readjusted until there is a uniformity of the brightness. The detector device serves the purpose of deriving signals for the driving of the converter from the video signal.

According to a further embodiment example, the detector device consists of a first signal-displaying device adjacent to the video signal line and the pulse generator for the delaying of a video signal by two pulse cycles of the pulse generator. A first comparing device is connected on the input side with the video signal line and the output of the first delay device. A second signal delay device is connected with the output of the first comparing device and the pulse generator. A second comparing device is connected on the input side with the output of the first delay device and the second delay device. The video signal on the video signal line consists of a sequence of binary values 0 or, respectively, 1, which in each case remain constant for the duration of a pulse cycle. A 0 value brings about a display of a blank on the screen. An uninterrupted signal sequence of 1-values brings about the display of a line, and a signal sequence of 0-1-0 values brings about the display of a point. The detector device delays the signal sequence by two pulse cycles and in each case compares three consecutive binary values of the video signal. With this, an unambiguous identification of the three occurring character parts—line, point, and blank is guaranteed. The detector device after the comparison assumes one of three output states.

According to a further embodiment of the invention, the first signal delay device is comprised of a series connection of a first bistable flip-flop and a second bistable flip-flop. The second signal delay device is comprised of a third bistable flip-flop. All flip-flops are connected with the pulse generator. This has the advantage that the delaying of the video signal proceeds synchronously with the pulse cycle.

According to a further embodiment example, the video amplifier is current-controlled; the converter consists of a circuit for current addition and has two switches provided with control inputs and two resistors; and the detector is provided with two outputs connected with the control inputs.

The circuit for the current addition has the advantage that it converts the output states assumed by the detector device into a light intensity control signal which is sent directly to the video amplifier.

According to a further embodiment example, the second comparing device and the second switch are combined and designed as a second AND member with an open collector, and the first switch is designed as a first AND member with an open collector.

According to a further embodiment example, the arrangement displays a mode of operation line and a mode of operation function or changeover switch connected with this, which neutralized the detector. If the characters are displayed on the screen in the mode of operation described in the beginning with bright lines or points and blanks then the problem of the different brightnesses does not occur. Via the mode of operation line, then, the mode of operation function or changeover switch is activated which neutralizes the detector. The video signal can be supplied directly to the converter.

According to a further embodiment example, the mode of operation function switch is developed as a fourth AND member which is connected with the mode of operation line and lies between a first comparing device and a second delay device.

BRIEF DESCRIPTION OF THE DRAWINGS

FIG. 1 shows an alpha-numeric character;

FIG. 2 shows a connection diagram of a preferred embodiment of the invention; and FIG. 3 shows a table of output values of the switching arrangement according to FIG. 2.

DESCRIPTION OF THE PREFERRED EMBODIMENTS

FIG. 1 shows a depiction of the letter S as it can be output as a character on a data display device. It is composed of individual character parts, namely, horizontal lines and vertical rows of points. It stands as an example for a number of further characters which are also constructed of horizontal lines and vertical rows of points. On a screen of a data display device, the horizontal lines display a greater brightness than the points.

In FIG. 2, a converter 20 is designated (framed with a dot-dash line) and a detector device 30 is designated (also framed with a dot-and-dash line). A second AND member 4 with an inverting output is a component part both of the converter 20 and of the detector device 30. The converter 20 has a line 13 leading to the video signal amplifier (not depicted) for the light intensity control signal. A video signal line 11 with a video signal A is at an input of a first counting flip-flop 1 and also at an inverting input of a first AND member 5 as a first comparing device. The output of the first counting flip-flop 1 is connected with the input of a second counting flip-flop 2, whose output again is directed to an inverting input of the first AND member and to the converter 20. Flip-flops 1 and 2 form a first signal delay device. The signal of the output of the first counting flip-flop 1 is designated B, that of the second counting flip-flop 2 with C, and that of the first AND member with E. This output and a mode of operation line 12 are provided at the input of a fourth AND member 6 which serves as a mode of operation function or changeover. Its output signal is designated F. It is provided at the input of a counting flip-flop serving as a second delay device 7. Its output carries a signal designated G and is present at the second AND member which is designated as a second comparing device 4. At another input of the second AND member, there lies the output of the second counting flip-flop 2.

The converter 20 consists of a third AND member 3, to whose input the output of the second counting flip-flop 2 is connected. Via a first resistor 8 a positive voltage is connected so that the third AND member 3 is always connected through. The outputs of the third AND member 3 as well as the second AND member designated as a second comparing device 4 are inverting. The output signal of the third AND member 3 is designated H, that of the second is designated K. The output of the third AND member 3 is connected via a second resistor 9 with the line 13. Also, the output of the second AND member 4 is connected via a third resistor 10 with the line 13. The two AND members and the two resistors of the converter represent a circuit for the current addition. The pulse inputs of all counting flip-flops are connected with a line CLK with a pulse generator (not depicted).

In FIG. 3, the output signals B, C, D, E, F are depicted at a point in time t in dependence upon the video signal A at the point in time t. The output signals G, H and K are depicted for a point in time t+1, which lies after the point in time t by the time corresponding to one pulse cycle of the pulse generator. If the output value assumes a higher-valued state, then this is designated with the number "1". A low-value state is designated with the number "0", and a random state is designated with "X". The output signal B or, respectively, C, is identical with the video signal which is delayed by one pulse cycle or, respectively, two pulse cycles.

In the following, the function of the arrangement will be explained with the use of a signal sequence 0-1-0 of the video signal A and with the use of FIGS. 2 and 3. After two pulse cycles, the 0-1-0 pattern is pushed so far through the delay device 1,2 that the video signal A has the value associated with zero, the output signal B has the value associated with one, and the output signal C has the value associated with zero. Therefore, two low values lie at the inverting inputs of the first comparing device 5, whereby the output signal E assumes the higher value designated as 1. As long as the signal D on the mode of operation line 12 has a higher value, which is the case in normal operation, the output signal F is also found in the higher value state. After the next pulse cycle, the output value C or, respectively, G, has the value of the output value B or, respectively, F, during the previous pulse cycle, in the example, the value 1. This means that the output values H and K of the AND members of the converter 20 assume a low value state. With this, the current on the line 13, which determines the light intensity of the cathode ray of the data display device, is determined by the resistors 9, 10 which are now connected in parallel. Thus, the current in the output of the video amplifier is larger and the brightness is higher. A parallel connection of the two resistors 9, 10 only proceeds in the case of a 0-1-0 signal sequence which corresponds to the display of an individual point on the screen. In all other cases, the current on the line 13 is determined either by the resistor 9 or by the resistor 10. When the output value H assumes a higher-value state and the output value K assumes a low-value state, the current on the line 13 is limited by the resistor 9. If H assumes a low value state and K a higher value state, then the current is determined by the resistor 10.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A system for generation of a light intensity control signal for a video amplifier of a data display device connected with a video signal on a video signal line and a pulse generator by which characters are displayed by use of horizontal bright lines, vertical rows of bright points, and also blanks, comprising: a converter means connected with the video amplifier for providing a light intensity control signal with differentiatable analog output values to the video amplifier; a detector device means connected with the video signal line and the converter means for identification of a signal sequence associated with a line, a point or a blank; and said detector device means including first delay means for delaying the video signal by two clock pulse periods of clock pulses of said pulse generator, and comparator means for providing to the converter means a signal increasing the light intensity only upon recognition of a portion of the video signal which corresponds to a bright point arranged between two directly adjacent blanks.

2. A system according to claim 1 wherein said comparator means comprises a first comparing device connected at an input side with the video signal line and the output of the first delay means, a second delay means for delaying an output signal of the first comparing device by one clock pulse period of the clock pulses connected with the output of the first comparing device and the pulse generator, and a second comparing device connected at an input side with an output of the first delay means and the second delay means.

3. A system according to claim 2 wherein said first delay means is comprised of a series connection of a first bistable flip-flop and a second bistable flip-flop, and that the second delay means is comprised of a third bistable flip-flop.

4. A system according to claim 1 wherein the video amplifier is current-controlled and the converter means is comprised of a circuit for current addition.

5. A system according to claim 1 wherein said comparator means is comprised of first and second comparator devices and a second delay means.

6. A system according to claim 5 wherein a mode of operation changeover switch is connected between the first comparator device and the second delay means.

* * * * *